US007416143B1

(12) United States Patent
Leyshon et al.

(10) Patent No.: US 7,416,143 B1
(45) Date of Patent: Aug. 26, 2008

(54) TABLET CRUSHER

(75) Inventors: Frank Leyshon, Cambridge, OH (US); Joe Young, Little Hocking, OH (US)

(73) Assignee: Healthcare Logistics, Inc., Circleville, OH (US)

( * ) Notice: Subject to any disclaimer, the term of this patent is extended or adjusted under 35 U.S.C. 154(b) by 33 days.

(21) Appl. No.: 11/153,517

(22) Filed: Jun. 14, 2005

(51) Int. Cl.

| | |
|---|---|
| ***A47J 17/00*** | (2006.01) |
| ***A47J 43/00*** | (2006.01) |
| ***A47J 42/00*** | (2006.01) |
| ***B26B 25/00*** | (2006.01) |
| ***B26B 27/00*** | (2006.01) |

(52) U.S. Cl. .................... 241/168; 241/169.2; 100/233; 100/289; 100/295

(58) Field of Classification Search ................. 241/168, 241/169.1, 169.2, DIG. 27; 269/182, 249; 100/133, 289, 295, 233
See application file for complete search history.

(56) References Cited

U.S. PATENT DOCUMENTS 133,511 A * 11/1872 Whitney ..................... 100/213
277,809 A * 5/1883 Taylor ........................ 264/238
602,088 A * 4/1898 Morgan ....................... 99/507
1,198,666 A * 9/1916 Ryan .......................... 100/213
1,543,036 A * 6/1925 Taylor ........................ 100/125
2,535,553 A * 12/1950 Stoner ......................... 99/504
2,826,138 A * 3/1958 Pexton ....................... 100/289
2,893,032 A * 7/1959 Selmer ........................ 401/12
D337,828 S 7/1993 Gordon ..................... D24/220
5,915,637 A * 6/1999 Parsons ...................... 241/168
D433,148 S 10/2000 Dennis ...................... D24/220
6,637,683 B1 10/2003 (Lomax) Wilbur ....... 241/101.2
6,637,685 B1 10/2003 Kruger .................... 241/169.1
D497,543 S 10/2004 Buckley ...................... D9/707
D502,267 S 2/2005 Leyshon et al. ............ D24/220
6,893,012 B2 * 5/2005 Wong ......................... 269/249
D534,279 S * 12/2006 Leyshon et al. ............ D24/220

* cited by examiner

*Primary Examiner*—Bena Miller
(74) *Attorney, Agent, or Firm*—Standley Law Group LLP

(57) ABSTRACT

The invention is a tablet crusher including a linkage that is operable to bring to bear a force on a platen so as to urge it against an anvil, wherein platen and anvil are shaped so as to bring about a crushing force upon a tablet disposed therebetween. The device comprises: (1) a base; (2) an anvil integrally fixed to the base, the anvil having a concave crushing face; (3) a platen having a convex crushing face, coupled at a pivot to the base so as to be moveable against the anvil; (4) a screw actuator for facilitating movement of the platen against the anvil, the screw actuator having a handle; whereby movement of the handle produces movement of the platen relative to the anvil, for crushing a tablet between the anvil and the platen.

8 Claims, 5 Drawing Sheets

TABLET CRUSHER

TECHNICAL FIELD OF THE INVENTION

The present invention relates generally to tablet and pill crushing devices.

BACKGROUND OF THE INVENTION

The present invention is an improvement in tablet crushing devices of the prior art, including the tablet crusher described in U.S. Pat. No. 5,915,637, which is hereby incorporated herein by reference.

The present invention provides a tablet crushing device that may be constructed with fewer and less complicated parts, while providing a smooth and quiet crushing action, while providing all of the other advantages of earlier devices such as that described in U.S. Pat. No. 5,915,637.

These other advantages include effective crushing of the tablet into small particle size, relatively easy hand operation of the device through the use of mechanical advantage, the ability to crush tablets of various size and shape, the elimination of the need for use of impact forces, and the reduction of risk of cross contamination from different medications.

Another advantage of the present invention is that the mechanism is designed to be simpler and to avoid any undue strain on load bearing parts. In this regard, the tablet crusher described in U.S. Pat. No. 5,915,637 uses a complex linkage that may be strained by excessive force.

Finally, it remains desirable to provide a tablet crusher that is more compact than those of the prior art, such as those described in U.S. Pat. No. 5,915,637 and U.S. Design Pat. No. D502,267.

Accordingly, there remains a need for a tablet crusher that is effective, efficient and relatively quiet in operation, and which offers all of the same advantages of prior art devices while eliminating some of the remaining disadvantages.

A. SUMMARY OF THE INVENTION

The present invention includes a tablet crusher that is quiet in operation and which does not rely on impact forces to crush pills.

In broadest terms, the tablet crusher of the present invention includes a screw actuator that is operable to bring to bear a force on a platen so as to urge it against an anvil, and wherein the platen and anvil are shaped so as to bring about a rolling crushing force upon a tablet disposed therebetween, the crushing force supplied by a screw actuator which is mounted to the base.

The preferred embodiment of the present invention is a device for crushing a tablet, comprising: (1) a base; (2) an anvil integrally fixed to the base, the anvil having a concave crushing face; (3) a platen having a convex crushing face, coupled at a pivot to the base so as to be moveable against the anvil; (4) a screw actuator for facilitating movement of the platen against the anvil, the screw actuator having a handle; whereby movement of the handle produces movement of the platen relative to the anvil, for crushing a tablet between the anvil and the platen.

It is preferred that the device additionally comprises a swivel linkage between the screw actuator and the platen, such that the angle between the screw actuator and the platen may change as the platen is advanced toward the anvil.

The base portion may be made as one piece or as multiple pieces, and may also include a bottom base comprising an opening to a storage cavity.

The device of the present invention may preferably include a pouch for receiving a tablet to be crushed, the pouch being adapted for fitting between the anvil and the platen.

Other aspects and advantages of the present invention will become apparent from the following detailed description, taken in conjunction with the accompanying drawings, illustrating by way of example the principles of the invention.

DETAILED DESCRIPTION AND BEST MODE OF THE INVENTION

Figure 1:
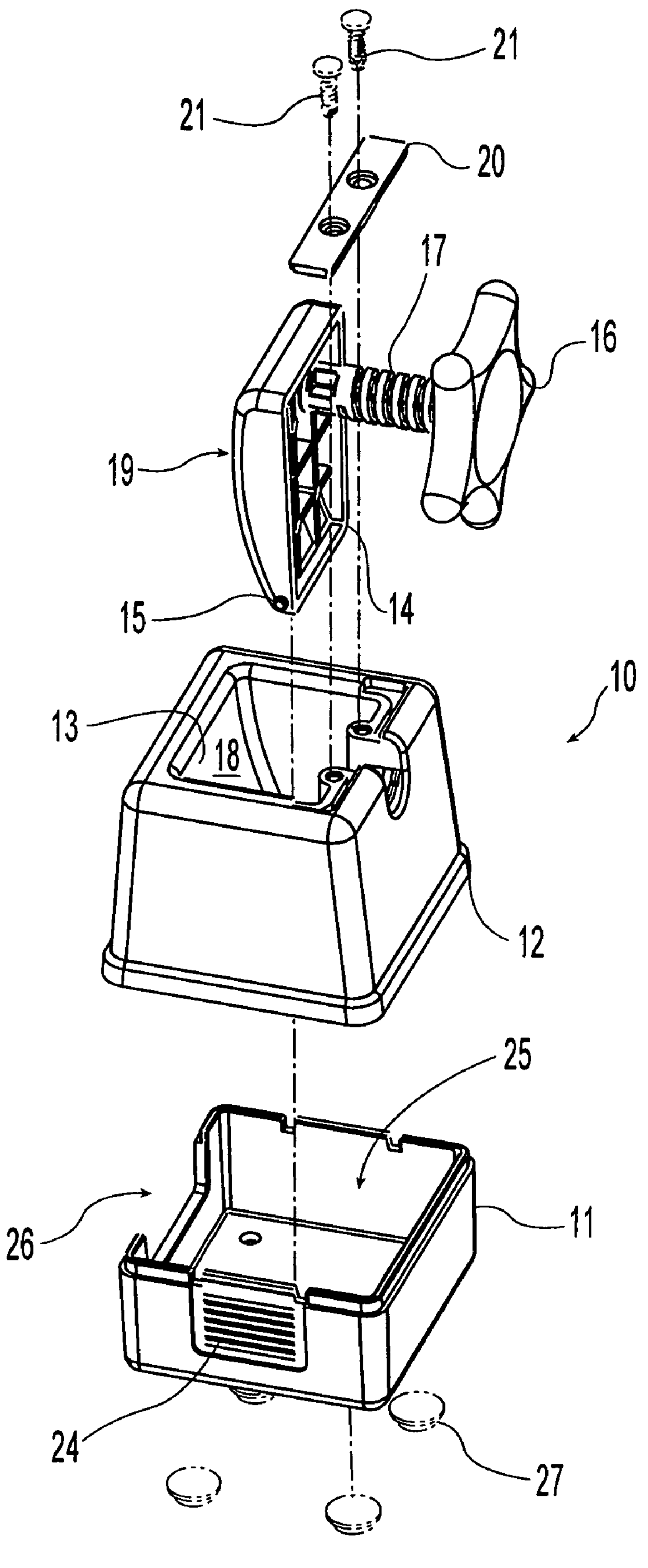
FIG. 1 is an exploded view of a tablet crusher in accordance with one embodiment of the present invention.

In accordance with the foregoing summary of the invention, the following presents a description of the preferred embodiment of the present invention which is also considered to be the best mode thereof.

In the following detailed description and in the several figures of the drawings, like elements are identified with like reference numerals.

The preferred embodiment of the present invention allows for the elimination of multiple compression links of the prior art devices while providing for a smooth crushing force to be brought to bear on the tablet-crushing anvil. The present invention also provides an assembly that may be easily disassembled for cleaning.

With reference now to the drawings, there is shown in FIG. 1 a tablet crusher 10 that is constructed according to a preferred embodiment of the present invention. The tablet crusher includes a bottom base portion 11 and a top base portion 12 which includes an integrally formed anvil 13. A platen 14 is pivotally connected to the anvil 13 (or alternatively to the base 11 by a pin or pivot 15 for rotational movement of the platen 14 against the anvil 13. A handle 16 is attached to a threaded fitting 17 that extends into a portion of the top base portion of the platen 14 to exert force upon the platen 14, when turned clockwise as with typically right hand threads, for facilitating movement of the platen 14 relative to the anvil 13. The bottom base portion 11 may also include a storage well 25 and an opening 26 to allow for the loading and dispensing of supplies, such as disposable plastic pouches used to hold the tablets to be crushed. Also shown are optional feet 27.

The platen 14 and anvil 13 have correspondingly shaped curved crushing surfaces, the platen 14 having a convex crushing surface 18 and the anvil 13 a concave crushing surface 19. This shape allows the tablet crusher to perform the crushing function with greater smoothness as handle 16 is turned. The threaded fitting 17 may be integrally formed with the handle 16, or may be attached together as separate pieces. The threaded fitting 17 may extend through top base portion 12 and be held in a removable position by any known attachment means, such as through plate 20 and screws 21, so that it may be replaced if necessary.

The tablet crusher of the present invention is also shown in an assembled form in FIGS. 2-9 wherein identical reference numbers refer to portions thereof.

Figure 2:
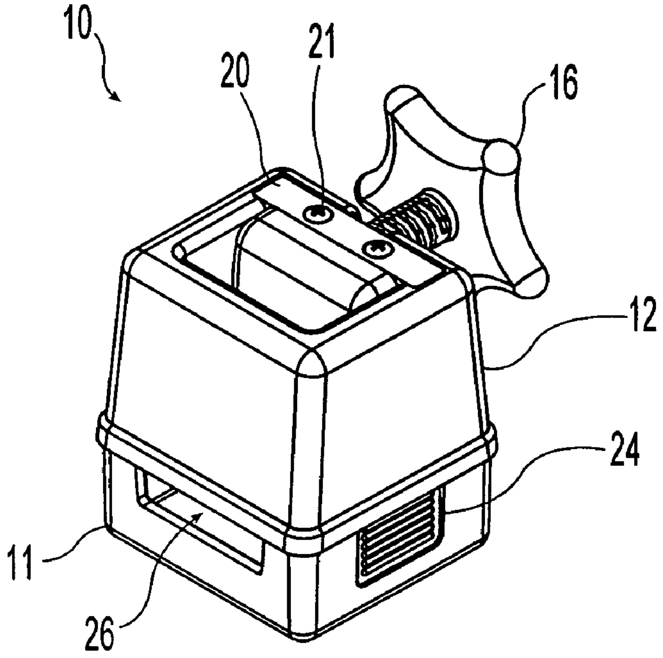
FIG. 2 is a top perspective view of a tablet crusher in accordance with one embodiment of the present invention.
Figure 3:
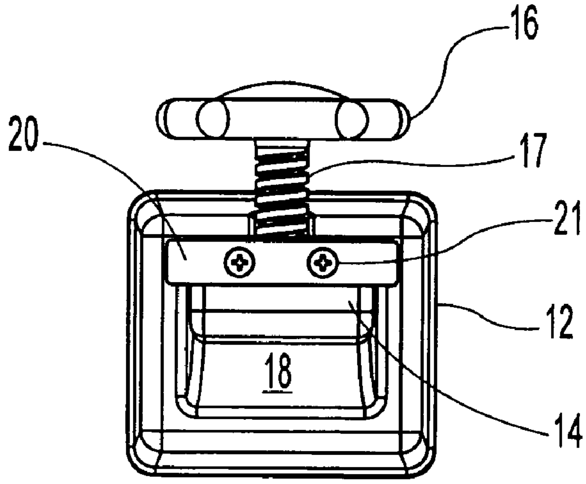
FIG. 3 is a top plan view of the tablet crusher in accordance with one embodiment of the present invention.

FIG. 2 is a top perspective view of a tablet crusher in accordance with one embodiment of the present invention. FIG. 2 shows bottom base portion 11 and top base portion 12 fitting together by a snap fit, although any other equivalent arrangement for attachment may be used, such as by using set screws or a hinge. FIG. 2 also shows flexible portion 24 that may be depressed to open the device to exposed storage well 25. FIG. 2 also shows the screw actuator handle 16 and threaded portion 17 as it would appear in its withdrawn position wherein the platen 14 is withdrawn from the anvil surface 18 to be in the open position. FIG. 3 is a top plan view of the tablet crusher in accordance with one embodiment of the present invention, in the position shown in FIG. 2. This view shows the device in the open position and the anvil surface 18 in more detail.

Figure 4:
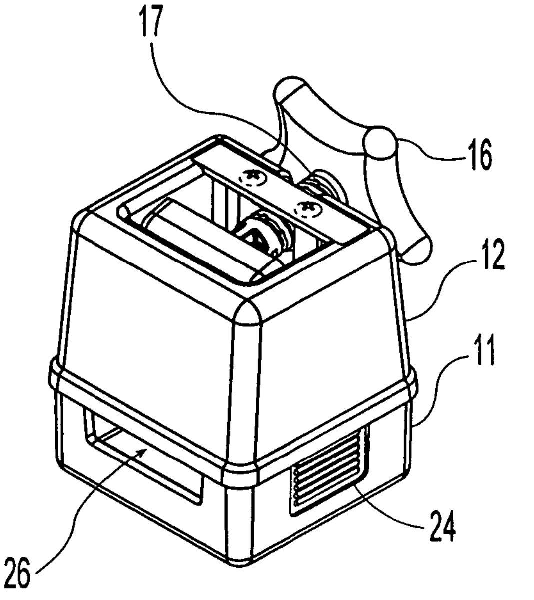
FIG. 4 is a top perspective view of a tablet crusher in accordance with one embodiment of the present invention.
Figure 5:
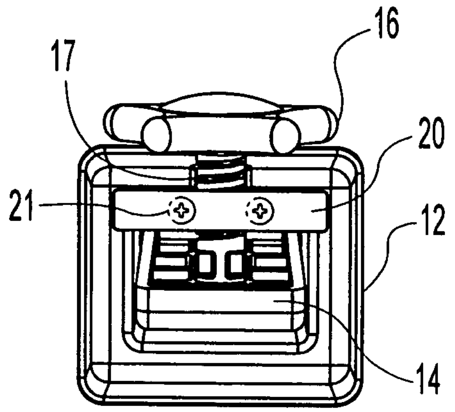
FIG. 5 is a top plan view of the tablet crusher in accordance with one embodiment of the present invention.

FIG. 4 is a top perspective view of a tablet crusher in accordance with one embodiment of the present invention wherein identical reference numbers refer to portions thereof. FIG. 4 shows the screw actuator's handle 16 and threaded portion 17 as it would appear in its closed position wherein the platen 14 is closed against anvil surface 18. FIG. 5 is a top plan view of the tablet crusher in accordance with one embodiment of the present invention, in the closed position shown in FIG. 4. This view shows the device in the closed position showing more detail regarding the attachment of the threaded portion 17 to platen 14, and the ability of these to pieces to swivel with respect to one another as the threaded portion 17 is advanced toward the closed position.

Figure 6:
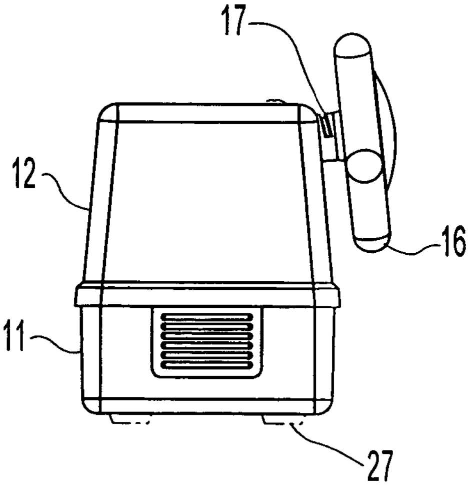
FIG. 6 is a side elevation view of the tablet crusher in accordance with one embodiment of the present invention.

FIG. 6 is a side elevation view of the tablet crusher in accordance with one embodiment of the present invention, also shown in the closed position shown in FIG. 4. This view shows feet 27 and flexible portion 24.

Figure 7:
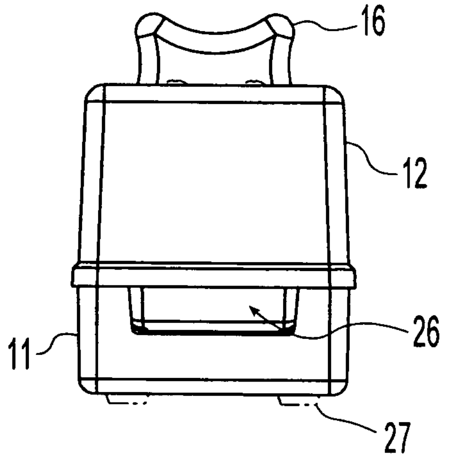
FIG. 7 is a side elevation view of the tablet crusher in accordance with one embodiment of the present invention.

FIG. 7 is a side elevation view of the tablet crusher in accordance with one embodiment of the present invention, also shown in the closed position shown in FIG. 4. This view shows feet 27 and opening 26 to the storage well.

Figure 8:
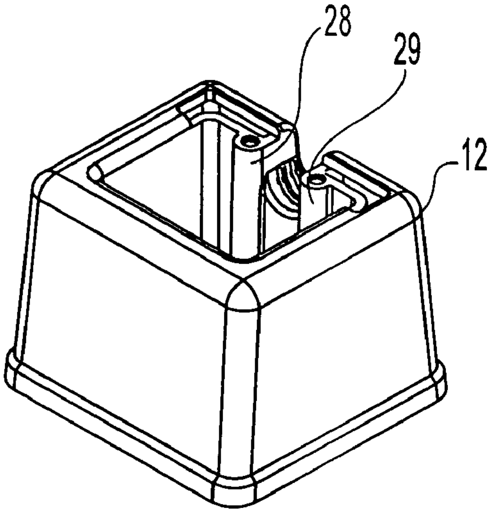
FIG. 8 is a perspective view of the top base portion of a tablet crusher in accordance with one embodiment of the present invention.
Figure 9:
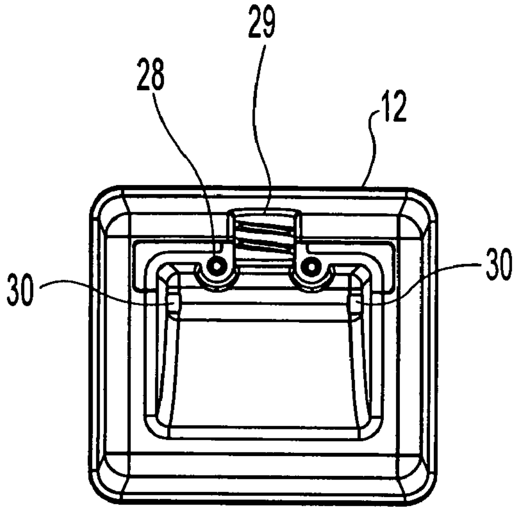
FIG. 9 is a top plan view of the top base portion of a tablet crusher in accordance with one embodiment of the present invention.

FIG. 8 is a perspective view of the top base portion of a tablet crusher in accordance with one embodiment of the present invention, wherein identical reference numbers refer to portions thereof. FIG. 8 also shows screw-accepting portions 28 that may be molded into top base portion 12, and the threaded well portion 29 that accommodates the threaded portion 17 of the screw actuator. FIG. 9 is a top plan view of the top base portion of a tablet crusher in accordance with one embodiment of the present invention, wherein identical reference numbers refer to portions thereof. This view shows apertures 30 at the bottom of the space provided for the platen 14. These apertures accept the pin or pivot 15 for rotational movement of the platen 14 against the anvil 13.

Figure 10:
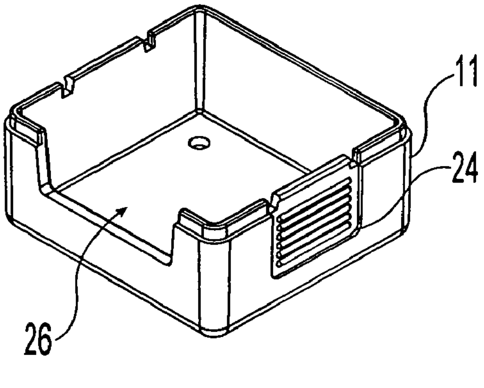
FIG. 10 is a perspective view of the bottom portion of a tablet crusher in accordance with one embodiment of the present invention.

FIG. 10 is a perspective view of the bottom portion of a tablet crusher in accordance with one embodiment of the present invention, wherein identical reference numbers refer to portions thereof.

Figure 11:
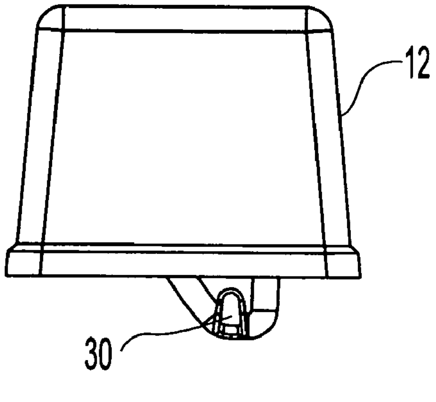
FIG. 11 is a side elevation view of the top base portion of a tablet crusher in accordance with one embodiment of the present invention.

FIG. 11 is a side elevation view of the top base portion of a tablet crusher in accordance with one embodiment of the present invention, wherein identical reference numbers refer to portions thereof. This view more clearly shows the portion of the top base portion 12 into which the platen 14 fits, and the apertures 30 at the bottom of the space provided for the platen 14 that allow the platen 14 to pivot therein.

Figure 13:
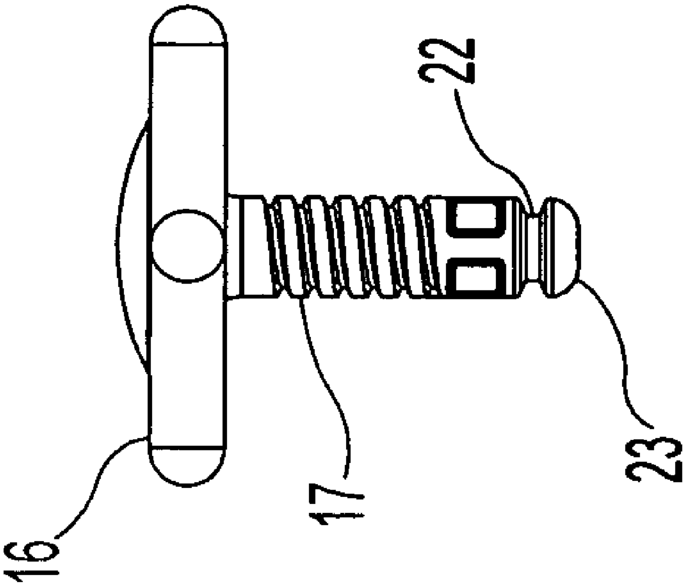
FIG. 13 is a detailed elevation view of a screw actuator used in a tablet crusher in accordance with one embodiment of the present invention.
Figure 12:
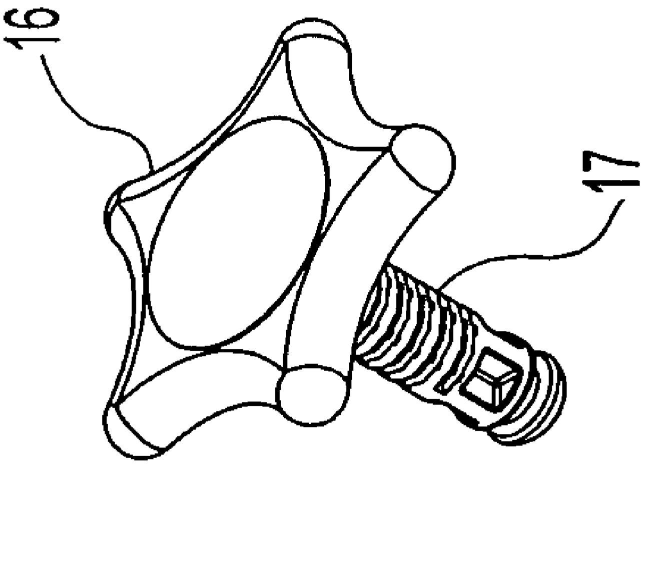
FIG. 12 is a detailed perspective view of a screw actuator used in a tablet crusher in accordance with one embodiment of the present invention.

FIGS. 12 and 13 are detailed views of a screw actuator used in a tablet crusher in accordance with one embodiment of the present invention. These views show the collar portion 22 and knob portion 23 of the screw actuator. Knob portion 23 fits into a correspondingly shaped well that may be molded into the rear side of platen 14 by an interference snap fit or other captive fit, to allow it to swivel through the spatial accommodation afforded by collar portion 22, which may provide an angle to permit the swiveling to a degree required by the geometry of the movement of the platen from its fully open to fully closed position, such as an angle of about 45 degrees.

The distance of travel from the maximum open position to the fully closed position is also preferably determined such that the fully closed position is reached at the maximum extension of the threaded fitting 17 into the top base portion 12. The threaded fitting 17 also preferably includes a collar portion 22 and knob end 23 that fits into a well 29 formed into the rear side of platen 14 by an interference fit so as to allow some freedom of movement by swiveling with respect to the platen 14 in response to the angular movement of the platen 14 with respect to the top base portion 12 and the longitudinal axis of the threaded portion 17 as the screw actuator is advanced. The preferred embodiment of the screw actuator may be appreciated from FIGS. 10 and 11 wherein identical reference numbers refer to portions thereof.

Another benefit of the curved platen and anvil faces is that the tablet, when placed in a pouch to be crushed, is crushed through a uniform movement. This occurs because the curved opposing surfaces tend to allow initial fragmentation of the tablet to proceed such that tablet fragments more readily move upward from the bottom of the pouch while remaining within the envelope of the crushing zone as actuation proceeds. In this regard, because the pouches are typically flat, the curved faces permit greater space to allow fragmentation to occur and continue throughout the actuation stroke.

In the preferred embodiment, the distance between the fully retracted platen and the anvil (shown in FIG. 2) anvil is set such that the complete alignment of the handle and compression link never achieved, thus preventing upward forces on pivot point G beyond the horizontal (movement that would actually retract the platen).

By action of the curved surfaces 18 and 19, crushing forces are brought to bear throughout the platen's travel against the anvil.

The dimensions of the tablet crusher of the present invention are not critical. The device as shown in the drawings has a base portion that is about 2.6 inches square and about 1.25 inches in height. The remaining portions of the device are approximately to that scale.

In operation, one or more pills are placed in a pouch. The pouch containing the pill(s) can then be inserted between the platen 14 and the anvil 13 and, depending upon the degree of crushing desired, the position of the pouch might be varied between the platen 14 and the anvil 13. One of the advantages of the present invention is that it allows for control over the degree to which the pill or tablet is crushed, something that is more difficult to control using crushers of the prior art described herein which use a lever action.

The pouch that may be used may be a simple rectangular pouch or one such as described in U.S. Design Pat. No. D497,543, which is hereby incorporated herein by reference. The preferred pouch is the subject of co-pending application Ser. No. 11/153,516, filed by Frank Leyshon and Ronald Funk and entitled Pill Crusher Pouch, which is hereby incorporated herein by reference.

These pouches typically are made of a plastic material and may be stored in the storage cavity 25 and be of sufficient size to extend through opening 26 to be available to the user.

The tablet crusher 10 may be made of any appropriately strong material, typically metal, as is known and used for these types of devices. As an alternative, the device may be made in part of a polycarbonate or ABS (e.g., glass filled).

The advantages of the invention when compared to the prior art include the ability to crush a tablet with a smooth hand action and with a device that may be made relatively compact compared to devices of the prior art.

It will be evident that there are additional embodiments and applications which are not disclosed in the detailed description but which clearly fall within the scope of the present invention. The specification is, therefore, intended not to be limiting, and the scope of the invention is to be limited only by the following claims. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All variations that come within the meaning and range of equivalency of the claims are to be embraced within their scope.

What is claimed is:

1. A device for crushing a tablet, comprising:

a base comprising an anvil with a crushing face;

a platen with a crushing face, the respective crushing faces being correspondingly shaped;

a pivot, fixing an end of the platen relative to the anvil, an opposing end of the platen being movable relative to the anvil about the pivot; and a screw actuator, linked to the platen between the ends thereof and operable to move the platen about the pivot relative to the anvil, providing force through the crushing faces to the tablet placed therebetween.

2. The device according to claim 1, wherein the base comprises a storage cavity adapted to contain a plurality of pouches.

3. The device of claim 1, wherein:

the screw actuator comprises a length of shaft with male threading thereon; and the base comprises a shaft-receiving opening with corresponding female threading.

4. The device of claim 3, wherein:

the shaft is linked at a first end thereof to a face of the platen opposite the crushing face.

5. The device of claim 4, wherein:

the shaft has a handle at a second end thereof.

6. The device of claim 5, wherein:

turning the handle in a first direction advances the platen opposing end towards the anvil to provide a rolling crushing force to the tablet and turning the handle in the opposite direction pulls the platen opposing end away from the anvil.

7. The device of claim 4, wherein:

a knob and collar at the first end of the shaft provide a swivel linkage of the shaft to the platen.

8. The device of claim 1, wherein:

the crushing face of the anvil is concave; and the crushing face of the platen is convex.

* * * * *